United States Patent
Herkersdorf et al.

(10) Patent No.: US 7,171,487 B2
(45) Date of Patent: Jan. 30, 2007

(54) METHOD AND SYSTEM FOR APPLICATION SPECIFIC PACKET FORWARDING

(75) Inventors: Andreas Herkersdorf, Langnau (CH); Sean G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/960,237

(22) Filed: Sep. 21, 2001

(65) Prior Publication Data

US 2002/0069294 A1  Jun. 6, 2002

(30) Foreign Application Priority Data

Sep. 22, 2000  (EP)  .................... 00120733

(51) Int. Cl.
*G06F 15/173* (2006.01)
(52) U.S. Cl. ........................ 709/238; 707/10
(58) Field of Classification Search ............... 709/238, 709/228, 227, 201–204, 219, 216, 206, 220, 709/229, 240, 224, 245, 222; 705/14, 8, 705/10; 370/389, 466; 707/104, 102, 10; 379/88, 93; 399/8; 715/505, 781, 809; 700/219; 714/712
See application file for complete search history.

(56) References Cited

U.S. PATENT DOCUMENTS

| | | | | |
|---|---|---|---|---|
| 4,866,635 A | * | 9/1989 | Kahn et al. ................... 706/46 |
| 5,260,866 A | * | 11/1993 | Lisinski et al. ............... 705/29 |
| 5,307,456 A | * | 4/1994 | MacKay ..................... 715/782 |
| 5,377,196 A | * | 12/1994 | Godlew et al. ............. 714/712 |
| 5,422,821 A | * | 6/1995 | Allen et al. ................. 700/219 |
| 5,606,439 A | * | 2/1997 | Wu ............................ 349/117 |
| 5,809,212 A | * | 9/1998 | Shasha ........................ 706/46 |
| 5,835,726 A | * | 11/1998 | Shwed et al. ............... 709/229 |
| 5,862,325 A | * | 1/1999 | Reed et al. ................. 709/201 |
| 5,907,550 A | * | 5/1999 | Hontz ......................... 370/389 |
| 5,930,338 A | * | 7/1999 | McKendry et al. ...... 379/88.25 |
| 5,974,467 A | * | 10/1999 | Haddock et al. ........... 709/240 |
| 5,999,610 A | * | 12/1999 | Lin et al. ............... 379/207.02 |
| 6,018,762 A | * | 1/2000 | Brunson et al. ............ 709/206 |

(Continued)

OTHER PUBLICATIONS

Health Status Assessment via the World Wide Web—Douglas Bell (1996); www.mcw.edu/midas/papers/AMIA-1996-Survey.ps.*

(Continued)

*Primary Examiner*—Thong Vu
(74) *Attorney, Agent, or Firm*—Ference & Associates

(57) ABSTRACT

The present invention provides a method and system handling information exchange through networks 102 to 110 for interactive information exchange, especially for interactive Internet based game show. At least one server 120 and a plurality of client machines 130 to 146 are connected through the networks 102 to 110. First, the server 120 receives subscription messages from a subset of said client machines 130 to 146. By receiving the subscription messages from the client machines 130 to 146 the provider of the particular program knows which users want to participate in the program. In response, the server 120 composes a request message offering predetermined response options, whereby corresponding response messages are returned through said networks 102 to 110 in one or more packets. In parallel, packet forwarding rules are set up in said networks 102 to 110 specifying a particular treatment for said returned packets dependent on said predetermined response options. Finally, the server sends the request message to the subset of client machines.

16 Claims, 2 Drawing Sheets

U.S. PATENT DOCUMENTS

| | | | |
|---|---|---|---|
| 6,021,438 A * | 2/2000 | Duvvoori et al. | 709/224 |
| 6,057,841 A * | 5/2000 | Thurlow et al. | 715/809 |
| 6,085,201 A * | 7/2000 | Tso | 715/505 |
| 6,085,233 A * | 7/2000 | Jeffrey et al. | 709/216 |
| 6,101,531 A * | 8/2000 | Eggleston et al. | 709/206 |
| 6,108,662 A * | 8/2000 | Hoskins et al. | 707/102 |
| 6,138,139 A | 10/2000 | Beck et al. | 709/202 |
| 6,170,011 B1 * | 1/2001 | Macleod Beck et al. | 709/224 |
| 6,243,613 B1 * | 6/2001 | Desiraju et al. | 700/104 |
| 6,253,188 B1 * | 6/2001 | Witek et al. | 705/14 |
| 6,256,614 B1 * | 7/2001 | Wecker et al. | 705/14 |
| 6,317,570 B1 * | 11/2001 | Uchida et al. | 399/8 |
| 6,324,569 B1 * | 11/2001 | Ogilvie et al. | 709/206 |
| 6,345,294 B1 * | 2/2002 | O'Toole et al. | 709/222 |
| 6,346,952 B1 * | 2/2002 | Shtivelman | 715/758 |
| 6,366,926 B1 * | 4/2002 | Pohlmann et al. | 707/104.1 |
| 6,385,620 B1 * | 5/2002 | Kurzius et al. | 707/104.1 |
| 6,449,650 B1 * | 9/2002 | Westfall et al. | 709/228 |
| 6,452,588 B2 * | 9/2002 | Griffin et al. | 345/169 |
| 6,466,654 B1 * | 10/2002 | Cooper et al. | 379/88.01 |
| 6,489,950 B1 * | 12/2002 | Griffin et al. | 345/168 |
| 6,505,166 B1 * | 1/2003 | Stephanou | 705/8 |
| 6,513,014 B1 * | 1/2003 | Walker et al. | 705/10 |
| 6,553,355 B1 * | 4/2003 | Arnoux et al. | 706/13 |
| 6,587,547 B1 * | 7/2003 | Zirngibl et al. | 379/88.17 |
| 6,604,143 B1 * | 8/2003 | Nagar et al. | 709/229 |
| 6,615,238 B1 * | 9/2003 | Melet et al. | 709/203 |
| 6,630,946 B2 * | 10/2003 | Elliott et al. | 715/781 |
| 6,633,630 B1 * | 10/2003 | Owens et al. | 379/93.24 |
| 6,697,360 B1 * | 2/2004 | Gai et al. | 370/389 |
| 6,697,824 B1 * | 2/2004 | Bowman-Amuah | 709/229 |
| 6,741,992 B1 * | 5/2004 | McFadden | 707/10 |
| 6,769,067 B1 * | 7/2004 | Soong | 713/201 |
| 6,772,204 B1 * | 8/2004 | Hansen | 709/206 |
| 6,779,004 B1 * | 8/2004 | Zintel | 709/227 |
| 6,782,413 B1 * | 8/2004 | Loveland | 709/204 |
| 6,785,728 B1 * | 8/2004 | Schneider et al. | 709/229 |
| 6,807,565 B1 * | 10/2004 | Dodrill et al. | 709/206 |
| 6,873,627 B1 * | 3/2005 | Miller et al. | 370/466 |
| 6,882,708 B1 * | 4/2005 | Bedingfield et al. | 379/88.18 |
| 6,912,272 B2 * | 6/2005 | Kirk et al. | 379/88.01 |
| 6,957,248 B2 * | 10/2005 | Quine et al. | 709/206 |
| 6,968,394 B1 * | 11/2005 | El-Rafie | 709/245 |
| 6,983,310 B2 * | 1/2006 | Rouse et al. | 709/206 |
| 7,020,618 B1 * | 3/2006 | Ward | 705/8 |
| 2002/0054587 A1 * | 5/2002 | Baker et al. | 370/352 |
| 2003/0191969 A1 * | 10/2003 | Katsikas | 713/201 |

OTHER PUBLICATIONS

Captor 2, a system for CASI surveys on Internet—Claudio Capiluppi Department ; europa.eu.int/en/comm/eurostat/research/conferences/ntts-98/papers/cp/016c.pdf.*

Using the Web as a Survey Tool: Results from the Second WWW User . . . —Pitkow (1995) ; ftp.cc.gatech.edu/pub/groups/gvu/tr/94-40.ps.Z.*

Possibilities for Active Messaging in PVM—Philip Mucci (1995) netlib.uow.edu.au/tennessee/ut-cs-95-277.ps.*

Automatic Generation of a Software Performance Model Using . . . —Hrischuk, al. (1995) www.sce.carleton.ca/ftp/pub/rads/syncWthread.ps.Z.*

Planning and Scheduling—Dean, Kambhampati (1996) enws318.eas.asu.edu/pub/pub/doc/pub/rao/doc/pub/rao/doc/crc-chapter.ps.*

Lyceum: A Multi-Protocol Digital Library Gateway—Maa, Esler, Nelson (1997) ☐techreports.larc.nasa.gov/pub/techreports/larc/1997/tm/NASA-97-tm112871.ps.Z.*

Coordinating Planning Activity and Information Flow in a . . . —desJardins, Wolverton (2000) ☐www.ai.sri.com/~marie/papers/dsipe-aimag.ps.Z.*

REMUS: A Security-Enhanced—Operating System Massimo ☐cesare.dsi.uniroma1.it/Sicurezza/doc/remus.pdf.*

Search Party: Using Randomcast for Reliable Multicast with . . . —Adam Costello Steven (1999) www.cs.berkeley.edu/~amc/research/search-party/csd-98-1011.ps.gz.*

Bounds on end-to-end performance via greedy, multi-path routing in integrated services networks Mithal, S.; INFOCOM '98. Seventeenth Annual Joint Conference of the IEEE Computer and Communications Societies. Proceedings. IEEE vol. 1, Mar. 29-Apr. 2, 1998 pp. 19-26 vol. 1.*

A CMOS combinational circuit-design method using mixed logic concepts Hudson, W.B.; Beasley, J.S.; Steelman, J.E.; Education, IEEE Transactions on vol. 38, Issue 3, Aug. 1995 pp. 266-273.*

* cited by examiner

METHOD AND SYSTEM FOR APPLICATION SPECIFIC PACKET FORWARDING

CLAIM FOR PRIORITY

This application claims priority from European Patent Application No. 00120733.1, filed Sep. 22, 2000, and which is hereby incorporated by reference as if fully set forth herein.

FIELD OF THE INVENTION

The present invention relates to a method and system for forwarding data packets through networks. More particularly, the present invention relates to a method and system for handling information exchange through networks related to interactive broadcasting systems, especially for interactive Internet based game shows.

BACKGROUND OF THE INVENTION

A switched communication network transfers data from source to destination through a series of network nodes. Switching can be done in one of two ways. In a circuit-switched network, a dedicated connection is established through the network and is held for as long as communication is necessary. An example of this type of network is the traditional telephone system.

A packet-switched network, on the other hand, routes data in small pieces called packets, each of which proceeds independently through the network. In a process called stored-and-forward, each packet is temporarily stored at each intermediate node, then forwarded when the next link becomes available. In a connection-oriented transmission scheme, each packet takes the same route through the network, and thus all packets usually arrive at the destination in the order in which they were sent. Conversely, each packet may take a different path through the network in a connectionless or datagram scheme. Since datagrams may not arrive at the destination in the order in which they were sent, they are numbered so that the destination user can reorder them properly.

A data packet is routed through the network primarily according to its destination address. In order to determine the correct subsequent network the router has to convert the destination address of a data packet into a corresponding next hop physical address (i.e. the outgoing port of a router). This task is called "address lookup" and is carried out as a part of the more complex "packet processing" task. The destination address is stored in a packet header. The packet header is a portion of a packet that precedes the actual data, containing source and destination addresses, error checking and other fields.

Packet processing, in addition, includes carrying out tasks like classification, filtering or load balancing, which may, based on multiple fields contained in the packet (not only the destination address), further influence the "address lookup" and the entire treatment and alterations applied to the packet in a router. For example, decide on specific QoS (Quality of Service) treatment of the packet, its mapping onto an MPLS (Multiprotocol Label Switching) label, discarding it or sending it to a control point in case of filtering or splicing with another TCP (Transmission Control Protocol) connection in case of load balancing.

In the last decade the amount of data packet traffic being communicated over communication networks has grown exponentially especially the Internet a well-known member of the family of connectionless packet-switched networks. In some circumstances the data packet traffic reaches such a level that conventional routers reach their limit. Since the performance of a router is crucial to the number of packets that can be transmitted through a communication network or from one communication network to another, a slow router can cause a backlog of data packets, or, in other words, a backlog of data packets is caused by an overload of the router. This might also happen because of an enormous amount of packets arriving at the router in a short period of time. Such a scenario might be produced if a huge number of users send messages over the network roughly at the same instant of time.

This might happen in various situations, for example, during a major sport event, when a large amount of visitors seeks to retrieve additional information about the event from a related web site. Furthermore, it has to be expected in systems providing interactive information exchange, such as Internet, television or radio game shows. In such shows the participants, which can practically be all viewers or listeners of the respective show, are normally asked to respond to some action in the show, e.g., by answering a question, making a selection or by voting for something or somebody. Having a large number of participants, the communication system used for data communication might be overloaded because of the large number of responses being returned in a very short period of time.

A need thus exists for a method and a system that reduces the peak load of data transfer through the networks for interactive information exchange.

SUMMARY OF THE INVENTION

The present invention provides a method and a system providing application specific forwarding of data packets through one or more networks. At least one server and a plurality of client machines are connected through the networks. The server is formed by a computer system which provides some service to the client machines, such as an interactive multimedia system. The expression 'interactive multimedia system' refers to any computer-delivered electronic system that allows the user to control, combine, and manipulate different types of media, such as text, sound, video, computer graphics, and animation. This also includes interactive broadcasting systems. Interactive broadcasting systems can, for example, be radio broadcasting, television broadcasting or cable television services with computer interfaces that enable viewers to interact with television programs.

The connection between client and server is normally by means of message passing, often over a network, whereby the present invention is not limited to any specific type of network. Practically, it can be a local area network (LAN), metropolitan area network (MAN), wide area network (WAN) with a wide variety of protocols, preferably using a store and forward protocol or a packet switching protocol, such as the Internet Protocol (IP).

First the server receives subscription messages from a subset of said client machines. The expression 'client machine' refers to the equipment a user or participant of the interactive multimedia or broadcasting system uses to interact with the transmitted program, such as a computer running a browser, i.e., a program which allows a person to read documents sent over the networks, or a set-top box, i.e., an electronic device designed to produce output on a conventional television set, on top of which it nominally sits. By receiving the subscription messages from the client machines the provider of the particular program knows which users want to participate in the program. However, that does not necessarily mean that the provider actually knows the identity of the users, but only a temporary address specifying how to reach the client machine through the networks.

In response, the server composes a request message offering predetermined response options, whereby corresponding response messages are returned through the networks in one or more packets. In parallel, packet forwarding rules are set up in said networks specifying a particular treatment for said returned packets dependent on said predetermined response options. Finally, the server sends the request message to the subset of client machines.

In a preferred embodiment of the method and system according to the present invention the setting up of forwarding rules includes to configure one or more routers that forward said response packets. The configuring of the routers may include, individually or in combination, to instruct said routers to discard response messages containing predetermined response options, to forward response messages containing a certain response option to a specified host connected to one of said networks, to combine more than one response messages arriving in a given time frame and to forward the combined messages as one message, to store the selected option of said response options in conjunction with the identity of the sender or to determine the amount of received response messages for each response option.

The method and system according to the present invention advantageously reduces the amount of packets sent through the networks, in order to transfer the information needed for the interactive broadcasting system. Thus, television stations or any other organizers of interactive broadcasting are enabled to use existing transmission facilities that could not be used otherwise because of a limited transmission capability. So, the television stations could just lease such transmission facilities from ISPs (Internet Service Provider) for the short periods in which the show is on air. This is much more cost effective than using dedicated networks and servers. In other words, the transmission facilities do not need to provide a bandwidth capable to cope with the expected peak load, that would be unused for most of the time.

Furthermore, the method and system according to the present invention allows to use state of the art network facilities also for a nation or even world wide interactive program, such as a game show. The inventive features enable the transmission facilities to process the replies in 'real time', without having to tell the users to try again.

Most advantageously, the inventive method and system provides existing transmission facilities for coping with data traffic having a high peak load caused by potentially tens of millions of replies arriving at a server within the space of a number of seconds. In summary, one can say that, the taught method and system show a way of enabling current server technology to handle such a huge number of requests with real time constraints.

BRIEF DESCRIPTION OF THE DRAWINGS

For a better understanding of the present invention, together with other and further features and advantages thereof, reference is made to the following description, taken in conjunction with accompanying drawings, and the scope of the invention that will be pointed out in the appended claims.

DETAILED DESCRIPTION OF THE PREFERRED EMBODIMENTS

Figure 1:
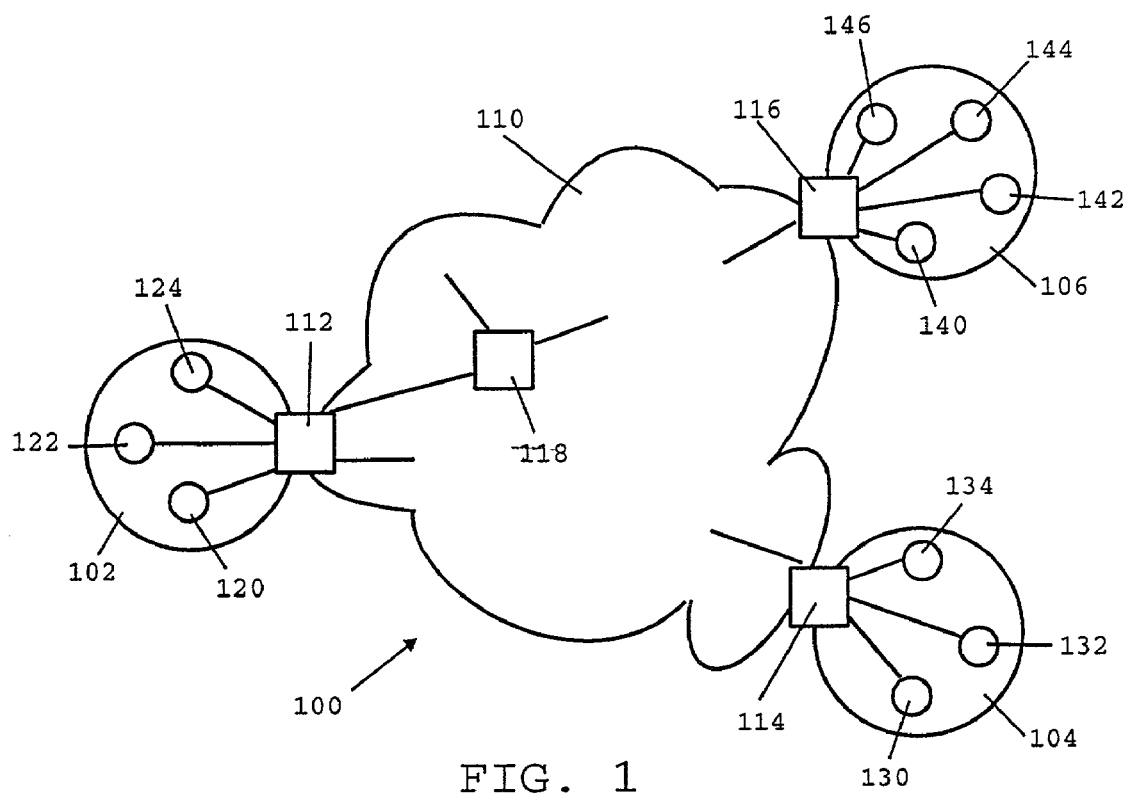
FIG. 1 shows a schematic view of a communication system to be used with the present invention.

With reference to FIG. 1, there is depicted a schematic view of a communication system 100 to be used with the present invention. The communication system 100 comprises a plurality of interconnected networks, whereas, for the sake of clarity, only a few networks are actually shown. A first, a second and a third local area network 102, 104 and 106 are shown in FIG. 1 each connected to a wide area network 110 through a first, a second and a third router 112, 114 and 116, respectively. Alternatively, the local area network may be formed by a domain, i.e., a group of computers whose hostnames share a common suffix, the "domain name", wherein the hostname is a unique name by which a computer is known in a network.

The wide area network 110 itself might consist of more than one networks interconnected by a plurality of routers, as illustrated by a fourth router 118 that is in place of the plurality of routers. The first local area network 102 comprises a first, a second and a third server 120, 122 and 124 all connected to the first router 112. For example, the first server is driven by the initiator of a game show or it belongs to the domain of an ISP (Internet Service Provider) offering the environment for setting up interactive broadcasting.

The second local area network 104 includes a first, a second and a third client machine 130, 132 and 134 and the third local area network 106 comprises a fourth, a fifth, a sixth and a seventh client machine 140, 142, 144 and 146 belonging to users (not shown) of the communication system 100. A group or all of the users are participants in the game show.

The routers 112, 114, 116, 118 are entities that are capable of making forwarding decisions based on a bit pattern found in a packet to be used for transmitting information from one of the servers 120 to 124 to one of the client machines 130 to 146 and vice versa.

Figure 2:
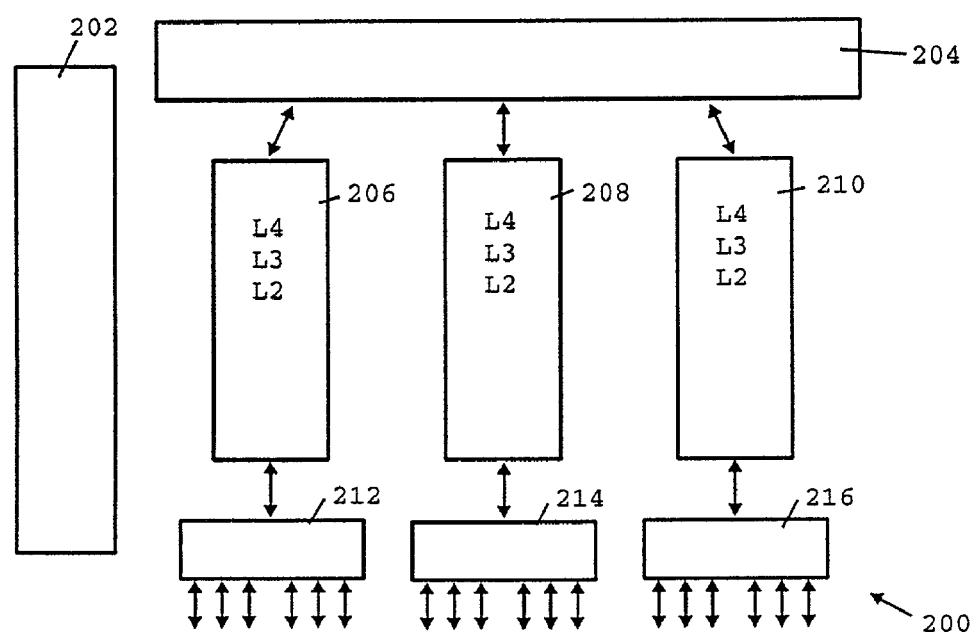
FIG. 2 shows a high level block diagram of a router to be used with the present invention.

Now with reference to FIG. 2, there is depicted a high level block diagram of a router 200. The router 200 consists of a system processor 202, a switch fabric 204, a first, a second and a third adapter 206, 208 and 210 and a first, a second and a third line interface 212, 214 and 216.

The system processor 202 controls the operation of all remaining portions of the router 200. For the sake of clarity, the functional connections and communication lines to the remaining portions are not shown. The switch fabric 204 connects all adapters 206 to 210 to forward packets. The first, second and third adapter 206, 208 and 210 are connected to the first, second and third line interface 212, 214 and 216 respectively.

Each of the adapters 206 to 208 implement the functional behavior that is associated to Layer 2, 3 and 4 according to the OSI (Open Systems Interconnect) network refernce model. The OSI architecture is split between seven layers, from lowest to highest: physical layer (Layer 1), data link layer (Layer 2), network layer (Layer 3), transport layer (Layer 4), session layer (Layer 5), presentation layer (Layer 6), application layer (Layer 7). Whereas each line interface 212 to 216 is configured to provide Layer 1 functionality, i.e., the physical layer.

The Layer 1 activities perform line termination functions for links like Fast/Gigabit Ethernet, i.e., a local area network, or SONET/SDH (Synchronous Optical NETwork/Synchronous Digital Hierarchy), i.e., a broadband networking standard based on point-to-point optical fiber networks. The Layer 2 to 4 functions focus on the data link, network and transport functions, and are basically dealing with all activities required to forward a packet according to the packet's destination address and forwarding priority.

The three pairs of line interfaces and adapters 212 and 206, 214 and 208 as well as 216 and 210 form multiple parallel stacks of Layer 1 to Layer 4 functions, typically represented by a physical adapter card within the switch or router. As shown in FIG. 2, there are interconnected via the switch fabric 204. The system processor 202 provides general services for control and management of the router 200.

The router shown in FIG. 2 preferably deploys network processors for the packet forwarding functions in the adapters 206 to 210. In other words, the network processors performs the L2, L3 and L4 functions of the adapters 206 to 210 in FIG. 2.

Figure 3:
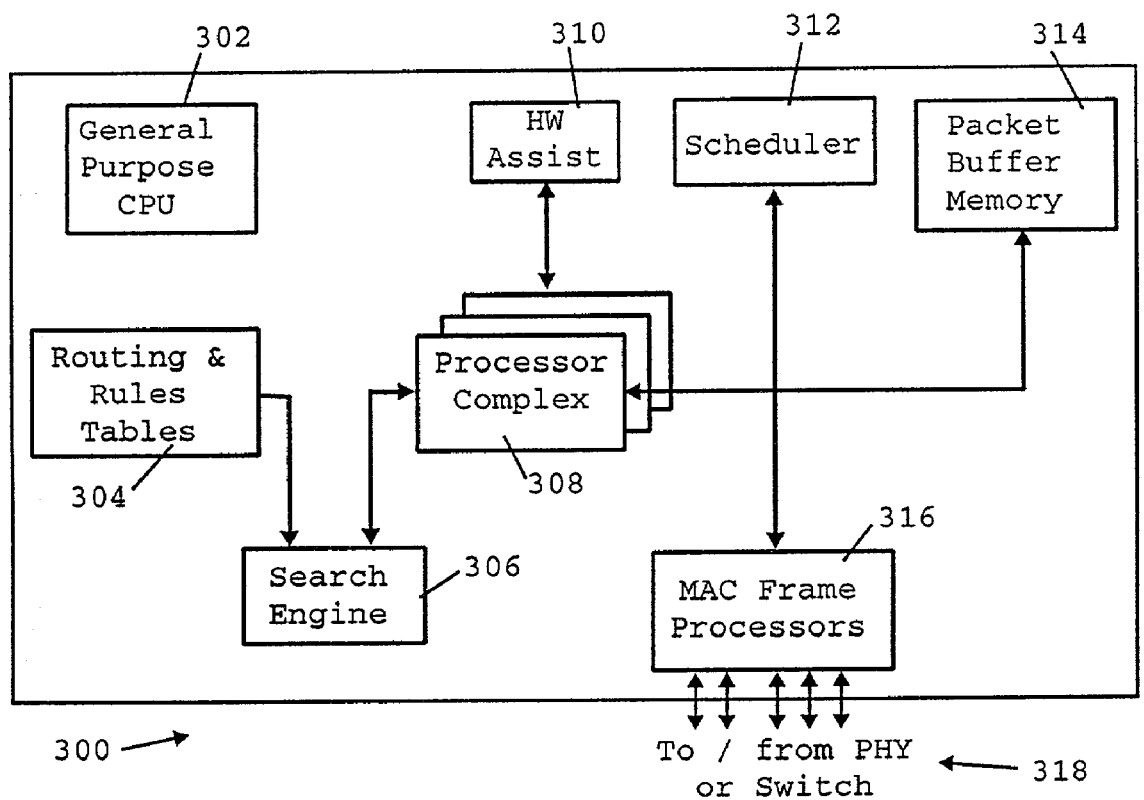
FIG. 3 shows a high level block diagram of a network processor to be used with the present invention.

FIG. 3 shows a high level block diagram of a network processor 300 to be used in a router according to FIG. 2. The network processor 300 comprises a general purpose CPU (Central Processing Unit) 302, routing and rules tables 304, a search engine 306, a processor complex 308, a hardware (HW) assist 310, a scheduler 312, a packet buffer memory 314, a MAC (Media Access Control) frame processor 316 and an interface 318.

The function of each portion 302 to 318 of the network processor 300 and the overall operation will be apparent from a description of an example packet walk through.

A packet is received from the respective physical interface implementing the Layer 1 functionality. The MAC frame processor 316 implements the data link processing (Layer 2), extracts the Layer 3 PDU (Protocol Data Unit)—also called IP packet—and stores this IP packet in the packet buffer memory 314. The processor complex 308 consists of a single or multiple RISC-like (Reduced Instruction Set Computer) processor cores optimized for packet processing. It fetches the network (Layer 3) and transport (Layer 4) packet headers from the packet buffer memory 314.

The processor complex 308 coordinates all operations performed on a packet with the support from different coprocessors. The HW (Hardware) Assist 310 performs operations like checksum calculation. The search engine 306 performs the complex address lookup function based on the routing and rules tables 304. In case of IP forwarding, the address resolution considers the IP destination address only, whereas, in case of Layer 4 switching, the IP destination and source address, and the TCP destination and source port numbers have to be considered for a unique identification of an end-to-end application flow identification. However, in case the router 300 is used as a dedicated gateway machine with special security precautions on it, in order to function as a so called 'firewall', the operations require multidimensional rules to be evaluated prior to forwarding (or discarding) a packet. Example for such a rule-based forwarding may be:

If IP source address is between 105.25.6.8 and 105.25.255.255 OR IP source address is bigger than 306.0.0.0 THEN Discard packet.

IF IP destination address is between 145.5.76.2 AND TCP source port equals 800 THEN Forward packet to output port 6 in priority 1.

In addition to the packet header fields, the processor complex 308 may also consider packet payload information for the forwarding decision. Each network processor or general purpose CPU core within a network processor is capable of dynamically updating routing or rule tables.

Moreover, it should be noted that the network processors' capabilities are not restricted to pattern matching operations only. In principle, the programming model of network processors allows any algorithm to be executed for packet analysis or packet manipulation. However, this is only limited by feasibility of specifying the respective algorithm in a suitable number of elementary processor commands in order to fulfill given real time constraints.

The present invention will now be explained in greater detail, by way of an example, with reference to game shows. Game shows are ubiquitous in television schedules. Such games are characterized by a small set of members of the public physically present in an television studio replying to questions set by a presenter. The method and system according to the present invention allows every viewer to be a contestant as well. Multiple choice questions could be given ("is it A, B or C ?") or voice recognition systems used to allow open questions ("What is the capital of France ?") and answers returned across a modem attached to a set top box attached to the television. This enables viewers to become more active and in consequence less prone to change channels.

During the game, questions appear on the viewers screen and the viewers choose one. Different replies result in packets with different packet headers, or packets with identical header information but different payload content. The actions to be taken by the router (or network processor) to support the Internet game application may be encoded in the regular routing or rules tables. For example, correct answers can be identified as a particular destination IP address and TCP port number pair. Correct answers are forwarded to a particular target host (the TV station) which keeps track of the scores of the individual players while false responses are discarded. Alternatively, it is searched within the packet payload for a specific pattern to determine the correctness of the reply. All of these actions are provided by configuring one or more routers in the networks.

As the game show is bounded in time, and a winner must be found within that time, the order in which questions are asked can be altered as a function of their level of difficulty and the number of participants left. The required reply handling rate for Internet based game shows according to the present invention is achieved by taking advantage of application specific knowledge within the forwarding of the packets, for example, during the packet treatment within a network processor. Based on the packet analysis, the network processor compiles different response messages to the originator of the packet. Thus, an offloading of the game server is achieved.

Furthermore, in another embodiment of the present invention the response message to the questions are dispatched to the routers through which end users are connected to television stations servers and have those edge routers (routers 114 and 116 in FIG. 1) make application specific forwarding decisions. Another alternative could be to concentrate the response message processing to the one edge router the ISP or game show provider is connected to (router 112 in FIG. 1).

Further preferred embodiments of a particular response message treatment are now given. A router drops incorrect answers. Only correct answers are passed to the server, which does not need to do any checking but immediately registers all received replies as correct. Preferably, the checking occurs as close as possible to the game user (edge router), in order to reduce the overall bandwidth usage of the network. The server is configured in a way to mark answers as incorrect if it has not received a response message from a given user.

Alternatively, the router forwards correct and incorrect response messages to different locations, e.g., correct response messages to servers 120 and 122, incorrect responses to server 124. The aforementioned advantage also applies to this embodiment: the servers do not need to check the reply and not all the replies are sent over the same link. This leads to a reduction of the bandwidth requirement on a given link. Furthermore, the router receiving a response message determines its validity, so the data itself does not have to be forwarded, this further reduces the needed bandwidth.

Furthermore, a router could aggregate multiple small packets in one single large packet all containing either correct or incorrect replies. Reducing both the amount a data to be sent, the required bandwidth and the amount of processing that the server has to carry out.

Instead of configuring all routers in the path from on client machine to the receiving server, only the ISP-connected edge router (router 112 in FIG. 1) is instructed. This has the advantage that only a single router is required to be updated.

The Internet game show may or may not, be coupled with a live TV show. It is also conceivable that a game application, hosted and moderated by the ISP, runs an interactive game show. Contestants participate over the Internet until a winner is determined and the next game can start. Billing for the game participation can be coupled with electronic money for the transmission of response messages by the participants.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means any expression, in any language, code or notation, of a set of instructions intended to cause a system having an information processing capability to perform a particular function either directly or after either or both of the following a) conversion to another language, code or notation; b) reproduction in a different material form.

It is to be understood that the present invention, in accordance with at least one presently preferred embodiment, teaches a method and system for handling interactive information exchange through networks having a plurality of client machines, the method comprising the steps of: composing a request message offering predetermined response options, whereby corresponding response messages are returned through said networks in one or more packets; setting up packet forwarding rules in said networks specifying a particular treatment for said returned packets dependent on said predetermined response options; sending said request message to said subset of client machines.

Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for handling interactive information exchange through networks having a plurality of client machines, the method comprising the steps of:
    composing a request message offering predetermined response options, whereby corresponding response messages are returned through said networks in one or more packets;
    setting up packet forwarding rules in said networks specifying a particular treatment for said returned packets dependent on said predetermined response options;
    sending said request message to said subset of client machines.

2. The method according to claim 1, further comprising an initial step of receiving a subscription message from a subset of said client machines.

3. The method according to claim 1, whereby said request message is composed in a way that said corresponding response message only consists of one packet.

4. The method according to claim 1, whereby said request message is composed in a way that said chosen predetermined response options is encoded in a data portion of said respective response packet.

5. The method according to claim 1, whereby said request message is composed in a hypertext document format and comprises a program that can be executed on the client machines and composes said response messages upon an interaction of a user of a client machine.

6. The method according to claim 1, whereby setting up forwarding rules includes the step of configuring one or more routers that forward said response packets.

7. The method according to claim 6, whereby configuring said routers includes the step of instructing said routers to discard response messages containing predetermined response options.

8. The method according to claim 6, whereby configuring said routers includes the step of instructing said routers to forward response messages containing a certain response option to a specified host connected to one of said networks.

9. The method according to claim 6, whereby configuring said routers includes the step of instructing said routers to combine more than one response messages arriving in a given time frame and to forward the combined messages as one message.

10. The method according to claim 6, whereby configuring said routers includes the step of instructing at least one of said routers to store the selected option of said response options in conjunction with the identity of the sender.

11. The method according to claim 6, whereby configuring said routers includes the step of instructing at least one of said routers to determine the amount of received response messages for each response option.

12. The method according to claim 1, further comprising the steps of receiving response messages and sending a second request message only to client machines from which a response message containing a certain response option was received.

13. The method according to claim 1, further comprising the steps of receiving response messages and storing the options chosen grouped by said sending client machines.

14. A computer program product stored on a computer usable medium, comprising computer readable program means for causing a computer to perform a method according to claim 1.

15. A program storage device readable by machine, tangibly embodying a program of instructions executable by the machine to perform method steps for handling interactive information exchange through networks having a plurality of client machines, said method comprising the steps of:

composing a request message offering predetermined response options, whereby corresponding response messages are returned through said networks in one or more packets;

setting up packet forwarding rules in said networks specifying a particular treatment for said returned packets dependent on said predetermined response options;

sending said request message to said subset of client machines.

16. A system for handling information exchange through computer networks having a plurality of client machines for interactive broadcasting, the system comprising a host computer connected to one of said networks for composing a request message offering predetermined response options, wherein corresponding response messages are returned over said computer network in one or more packets, and sending said request message to at least a subset of said plurality of client machines, and an interface for setting up packet forwarding rules in said computer network specifying a particular treatment for said returned packets dependent on said predetermined response options.

* * * * *

UNITED STATES PATENT AND TRADEMARK OFFICE
CERTIFICATE OF CORRECTION

PATENT NO. : 7,171,487 B2  Page 1 of 1
APPLICATION NO. : 09/960237
DATED : January 30, 2007
INVENTOR(S) : Herkersdorf et al.

It is certified that error appears in the above-identified patent and that said Letters Patent is hereby corrected as shown below:

Column 10, Line 12 "wherein" should be --whereby--

Signed and Sealed this

Eighth Day of May, 2007

JON W. DUDAS
*Director of the United States Patent and Trademark Office*